United States Patent
Earle et al.

(10) Patent No.: US 8,201,033 B2
(45) Date of Patent: Jun. 12, 2012

(54) MEMORY HAVING AN ECC SYSTEM

(75) Inventors: Adrian Earle, Kanata (CA);
Raviprakrash S. Rao, Bangalore (IN);
Vineet Joshi, Kanata (CA)

(73) Assignee: Taiwan Semiconductor Manufacturing Company, Ltd., Hsin-Chu (TW)

(*) Notice: Subject to any disclaimer, the term of this patent is extended or adjusted under 35 U.S.C. 154(b) by 0 days.

(21) Appl. No.: 13/174,018

(22) Filed: Jun. 30, 2011

(65) Prior Publication Data

US 2011/0258515 A1 Oct. 20, 2011

Related U.S. Application Data

(62) Division of application No. 12/833,613, filed on Jul. 9, 2010, now Pat. No. 7,996,734, which is a division of application No. 11/767,689, filed on Jun. 25, 2007, now Pat. No. 7,779,334.

(60) Provisional application No. 60/805,814, filed on Jun. 26, 2006.

(51) Int. Cl.
*G11C 29/00* (2006.01)

(52) U.S. Cl. ........................ 714/718; 365/201

(58) Field of Classification Search .................. 714/718; 365/201
See application file for complete search history.

(56) References Cited

U.S. PATENT DOCUMENTS

| | | | |
|---|---|---|---|
| 5,508,960 A | 4/1996 | Pinkham | |
| 5,555,250 A * | 9/1996 | Walker et al. | 714/763 |
| 6,237,116 B1 * | 5/2001 | Fazel et al. | 714/720 |
| 6,397,357 B1 | 5/2002 | Cooper | |
| 6,421,799 B1 | 7/2002 | Ferrant | |
| 6,822,913 B2 * | 11/2004 | Pochmuller | 365/201 |
| 6,851,081 B2 | 2/2005 | Yamamoto | |
| 6,862,233 B2 | 3/2005 | Laurent | |
| 6,996,017 B2 * | 2/2006 | Scheuerlein et al. | 365/201 |
| 7,032,142 B2 | 4/2006 | Fujioka et al. | |
| 7,142,476 B2 | 11/2006 | Hashimoto et al. | |
| 7,212,453 B2 | 5/2007 | Kikutake et al. | |
| 7,216,198 B2 * | 5/2007 | Ito et al. | 711/106 |
| 7,225,390 B2 | 5/2007 | Ito et al. | |
| 7,305,607 B2 | 12/2007 | Kang et al. | |
| 7,373,564 B2 | 5/2008 | Kikutake et al. | |
| 7,373,583 B2 * | 5/2008 | Hummler | 714/763 |
| 7,546,515 B2 | 6/2009 | Gross et al. | |
| 7,565,602 B2 | 7/2009 | Ausserlechner | |
| 7,620,884 B2 | 11/2009 | Ausserlechner | |

* cited by examiner

*Primary Examiner* — Esaw Abraham
(74) *Attorney, Agent, or Firm* — Slater & Matsil, L.L.P.

(57) ABSTRACT

An error correction code system for a memory is provided. The memory is provided with a parity array that is directly accessible. An embodiment of the error correction code system includes writing and reading test data directly to the parity array. The data read from the parity array is compared with the test data written to the parity array to detect errors.

19 Claims, 9 Drawing Sheets

MEMORY HAVING AN ECC SYSTEM

CROSS REFERENCE TO RELATED APPLICATIONS

This application is a divisional application of and claims priority to U.S. patent application Ser. No. 12/833,613, entitled "Memory Having an ECC System," filed on Jul. 9, 2010 now U.S. Pat No. 7,996,734, which is a divisional application of and claims the priority of U.S. patent application Ser. No. 11/767,689, entitled "Memory Having an ECC System," filed on Jun. 25, 2007, now U.S. Pat. No. 7,779,334, issued Aug. 17, 2010, which claims the benefit of priority of U.S. Provisional Patent Application No. 60/805,814 filed on Jun. 26, 2006, which applications are incorporated herein by reference in their entirety.

FIELD OF THE INVENTION

The present invention relates to error correction code (ECC) systems for semiconductor memories.

BACKGROUND OF THE INVENTION

Historically, ECC has been used to correct errors that occur within data patterns provided by semiconductor memories, such as DRAM, SRAM and non-volatile memories. As will be appreciated by those skilled in the art, this involves creating and storing extra bits known as parity bits. The extra data bits required for the ECC (parity bits) are appended to the data or memory. Typically semiconductor memories (both discrete and embedded) have used ECC to correct soft errors caused by radiation.

Typically for every 32 bits of data at least 6 extra bits of data are required. These 6 extra bits of data permit 2 errors to be detected and 1 to be corrected. While the examples in the present application use 32 data bits and 6 parity bits it will be understood that these examples are not intended to limit the scope of the present application and any suitable combination of data bits and parity bits can be used.

A traditional memory with ECC is shown in FIG. 1 and indicated generally by the numeral 10. M bits of data (for example, 32 bits) require N bits of parity data (for example, 6 bits), where M and N are non-zero integer values. The bits of data are stored in a main memory array 12 and the bits of parity data are stored in a parity memory array 14 that is appended to the main memory array 12. In the present example, M data bits DATA[0:m] flow in parallel to and from the I/O circuitry 16 to the main memory array 12 via the ECC logic circuitry 18 and the column decoders 22. For example, the column decoders 22 can be a 2:1, 4:1 or 8:1 multiplexor that connects one of several columns to one I/O. However, it is noted that column decoders may not be necessary if there is a 1:1 correspondence of columns to I/O. From this point forward, descriptions of data being coupled between the I/O circuits and column decoder circuits will be understood to include embodiments having no column decoders such that the I/O circuits are connected directly to the memory array columns or parity memory array columns.

The memory location for reading data from and for writing data to is selected by the row and column decoders 20 and 22 respectively. It is noted that a row generally refers to memory cells connected to a wordline, while a column generally refers to memory cells connected to a bitline. For a write cycle, the I/O circuitry 16 receives M bits of data D0 to DM and passes it to the ECC logic circuitry 18. The N parity bits DP0 to DPN are generated by the ECC logic circuitry 18 based on the values of the M bits, and the N parity bits and are stored in the parity memory array 14 substantially simultaneously with the storage of the M data bits in the main memory array 12. For a read cycle, the data q0 to qM are selected from the main memory array 12 by the row and column decoders 20, 22, respectively, amplified by the sense amplifiers 24 and presented to the ECC logic circuitry 18. At the same time, the corresponding parity bits QP0 to QPN are read out from the parity array 14. The ECC logic circuitry 18 evaluates whether the data and the parity data is good and corrects errors in the data and/or the parity data if the errors are within the limits for detection/correction. The I/O circuitry 16 then outputs the corrected data Q0 to QM received from ECC logic circuitry 18.

It will be appreciated that control logic 26 controls the row and column decoders 20, 22, respectively, the sense amplifiers 24, the ECC logic circuitry 18 and the I/O circuitry 16 for the read and write cycles in response to commands and address information.

Note that FIG. 1 is shown as a single bank for the purpose of simplicity. Those skilled in the art will realize that multiple banks are possible. Additionally those skilled in the art will realize that pipeline stages can be added at various places in the chip. For example the data can be latched in a pipeline stage before and/or after the ECC block. The sense amplifiers can also be used as pipeline stages.

Reference is now made to FIG. 2 which shows a block diagram of a conceptualization of ECC logic circuitry 18. In the present example, ECC logic circuitry 18 includes an ECC encoder 28, an ECC decoder 30 and a correction block 32. The ECC encoder 28 produces N parity data bits DP[0:n] from M input data bits D[0:m], where m and n are non-zero integer values. Using the 32 bit data example, the ECC encoder 28 and decoder 30 circuits can be implemented with chained XOR gates, where each parity bit is the XOR of 16 bits. Those skilled in the ECC art will understand that the selection of the bits to be combined is based on mathematics of the code. For example, one parity bit is an XOR of bit positions 0, 1, 4, 5, 10, 12, 14, 20, 21, 22, 23, 24, 25, 26, 27 and a logic high input. Four-bit XOR's can be used, thus only requiring 2 stages of 4 bit XOR's. Those skilled in the art will understand that there are several different logic circuit configurations for implementing ECC functionality. These parity data bits and input data bits are sent to the parity memory array 14, and main memory array 12, respectively, via the column decoders 22 during a write cycle. During a read cycle, M bits q[0:m] from the main memory array 12, via the column decoders 22 and sense amplifiers 24, are input to the ECC decoder 30 and the correction block 32. The ECC decoder 30 regenerates the N parity bits, and the N parity bits QP[0:n] from the parity memory array 14 are compared to the regenerated N parity bits within the correction block 32 to determine if the data is correct and which bit or bits are in error and need correction. The data is corrected, if required, and the corrected data Q[0:m] is output from the correction block 32.

Enable signal ECC_EN enables the ECC decoder 30 and the correction block 32. If ECC_EN is active (logic high for example) then the ECC decoder 30 will regenerate parity bits from the memory data q[0:m], and the correction block 32 will correct any errors in the data by using the regenerated parity bits and the parity bits QP[0:n]. If it is inactive, the parity bits are not regenerated by ECC decoder 30 and the correction block 32 outputs only the M bits of data Q[0:m] from the main memory array 12 (shown in FIG. 1).

In the present example, there are separate channels to avoid interference between the semiconductor memory write and read paths through the ECC logic circuitry 18. It will be appreciated that the ECC encoder 28 and the ECC decoder 30 can use the same logic circuitry. It will also be appreciated that rather than having an ECC encoder 28 and separate ECC decoder 30, the ECC input and output paths can share one ECC encoder/decoder to conserve silicon area.

In the physical implementation of the ECC logic circuitry 18, those skilled in the art will understand that the ECC logic circuitry 18 can be distributed in the column direction of the memory array 12, as generally illustrated in FIG. 1. Specific data bits and corresponding parity bits are grouped together in an area of the ECC logic circuitry 18 to facilitate the operations being executed upon them by logic elements. All the M data bits are routed over wires, as are the N parity bits. However, one or more parity bits will need to be routed from the parity array 14 to a left-most area of ECC logic circuitry 18. Those skilled in the art will understand that long wires results in extra resistive capacitive (RC) delay, thereby limiting ECC performance as the circuitry must wait for the slowest parity bit to arrive before executing ECC operations. Also, increased capacitance results in increased power consumption.

While ECC is used to correct logical errors of data stored in the memory array 12 during normal operation of the memory, memory testing is executed after fabrication to identify physically defective memory cells. Those skilled in the art will understand that anomalies during semiconductor fabrication can cause such defects in the memory array and the logic circuits of the memory. Redundancy in the memory array, including redundant rows and/or columns of memory cells, are available for replacing a regular row or column having a defective memory cell. As shown in FIG. 1, access to the memory array 12 is possible via the I/O circuitry 16 for writing test patterns and for reading out the test patterns. As previously discussed, the ECC decoder 30 and correction block 32 can be disabled such that the parity bits are ignored and only the data bits are output.

Unfortunately, there is no direct I/O access to the parity array allowing a tester to write test patterns to and to read test patterns from, the parity array 14. Therefore, the presence of defective memory cells therein cannot be tested. Furthermore, as fabrication defects can affect the logic elements of the ECC logic circuitry 18, there is no means for testing the logic functionality. It should be well understood that defects in the parity array 14 will result in correct data being inadvertently changed due to a faulty parity bit.

It is therefore desirable to improve the performance and testability of ECC semiconductor memory systems.

SUMMARY OF THE INVENTION

According to one aspect, there is provided a memory device having an error correction code system. The memory device includes a memory array, a parity array, and error correction code (ECC) logic circuitry. The memory array has memory cells arranged in first columns for storing data. The parity array has memory cells arranged in second columns for storing parity data corresponding to the data. The parity array has at least one second column located between two sub-arrays of the memory array. The ECC logic circuitry receives the data from the memory array and the parity data from the parity array in response to a read operation, for detecting and correcting bit errors in the data. According to an embodiment of the present aspect, the memory device can further include column decoders or sense amplifiers. The column decoders select the first columns of the memory array for accessing the data, and select the second columns of the parity array for accessing the parity data. The sense amplifiers are coupled to the first columns and the second columns for providing the data and the parity data.

According to an embodiment of the present aspect, each of said second columns of the parity array are distributed in said memory array for dividing the memory array into at least the two sub-arrays. Each of said second columns is located at a position for minimizing a wiring distance between each of said second columns and logic elements of the ECC logic circuitry for receiving parity data bits provided by said second columns. In an alternate embodiment, groups of said second columns of the parity array are distributed in said memory array for dividing the memory array into at least the two sub-arrays. Each of said groups of second columns includes at least two adjacent second columns, the at least two adjacent second columns being located at a position for minimizing a wiring distance to logic elements of the ECC logic circuitry for receiving parity data bits provided by the least two adjacent second columns. In a further alternate embodiment, said second columns of the parity array are grouped together and located at about the center of said memory array such that the memory array is divided into the two sub-arrays by the parity array. In yet another embodiment of the present aspect, the memory device can further include a parity access switch for selectively coupling the second columns of the parity array to input/output circuitry for bypassing said ECC logic circuitry in a direct access mode, and for selectively coupling the second columns to the ECC logic circuitry in an ECC mode. The parity access switch can include a multiplexor.

In a second aspect, the present invention provides a memory device having an error correction code system. The memory device has a memory array, a parity array, error correction code (ECC) logic circuitry, and a parity access switch. The memory array has memory cells arranged in first columns for storing data. The parity array has memory cells arranged in second columns for storing parity data corresponding to the data. The ECC logic circuitry receives the data from the memory array and the parity data from the parity array, for detecting and correcting bit errors in the data. The parity access switch selectively couples the second columns of the parity array to input/output circuitry for bypassing the ECC logic circuitry in a direct access mode, and for selectively coupling the second columns to the ECC logic circuitry in an ECC mode. In an embodiment of the present aspect, the parity array has at least one second column located between two sub-arrays of the memory array, where each of the two sub-arrays includes a plurality of first columns.

In a third aspect, the present invention provides a method of testing a parity array of a memory device having error correction code (ECC) logic circuitry. The method includes writing test data directly to the parity array; reading the test data directly from the parity array; and, comparing the test data read directly from the parity array to the test data. In one embodiment, the step of writing includes disabling the ECC logic circuitry; setting a switch for coupling the parity array to input/output circuitry such that parity data bypasses said ECC logic circuitry; and, providing the test data to the input/output circuitry. The step of comparing can include confirming that said test data is equal to said test data read from the parity array.

In a fourth aspect, the present invention provides a method of testing error correction code (ECC) logic circuitry of a memory device having a parity array. The method includes writing test data to a memory array; generating and writing parity bits in response to the test data to the parity array; and, comparing the parity bits stored in the parity array to known parity bits corresponding to the test data. According to an embodiment of the present aspect, the step of writing includes enabling the ECC logic circuitry; setting a switch for coupling said parity array to said ECC logic circuitry; and, providing the test data to the ECC logic circuitry. According to another embodiment of the present aspect, the step of generating and writing includes encoding the test data with the ECC logic circuitry for generating the parity bits. In yet a further embodiment of the present aspect, the step of comparing includes disabling said ECC logic circuitry; setting said switch for coupling said parity array to input/output circuitry for bypassing said ECC logic circuitry; and reading the parity bits directly from said parity array through the input/output circuitry.

In a fifth aspect, the present invention provides a method of testing error correction code (ECC) logic circuitry of a memory device having a parity array. The method includes writing test data directly to the memory device; and correcting the test data with the ECC logic circuitry. According to an embodiment of the present aspect, the step of writing test data includes writing the test data directly to one of a memory array of the memory device, the parity array and both the memory array and the parity array. The step of writing the test data directly can include disabling said ECC logic circuitry; setting a switch for coupling said parity array to input/output circuitry for bypassing said ECC logic circuitry; and, providing the test data to the input/output circuitry. The test data can include erroneous parity data to be written to the parity array, erroneous data to be written to the memory array, or at least one bit error to be written to the memory array and the parity array. In an aspect of the present embodiment, the step of correcting can include enabling the ECC logic circuitry; setting said switch for coupling said parity array to said ECC logic circuitry; providing the test data having the at least one bit error to the ECC logic circuitry; and, correcting the test data to provide corrected test data from the input/output circuitry.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described by way of example only with reference to the attached Figures, in which.

DETAILED DESCRIPTION

An error correction code system for a memory for improving performance and testability is described. The parity columns of the memory array can be positioned centrally within the array to minimize routing distance to ECC logic circuitry. The parity columns can be grouped together or distributed throughout the array to optimize performance. A multiplexor circuit can be included for selectively coupling the parity bits stored in the parity memory array to one or more external pins. Therefore, the parity columns can be directly tested, and testing of the ECC logic circuitry is facilitated.

Figure 3:
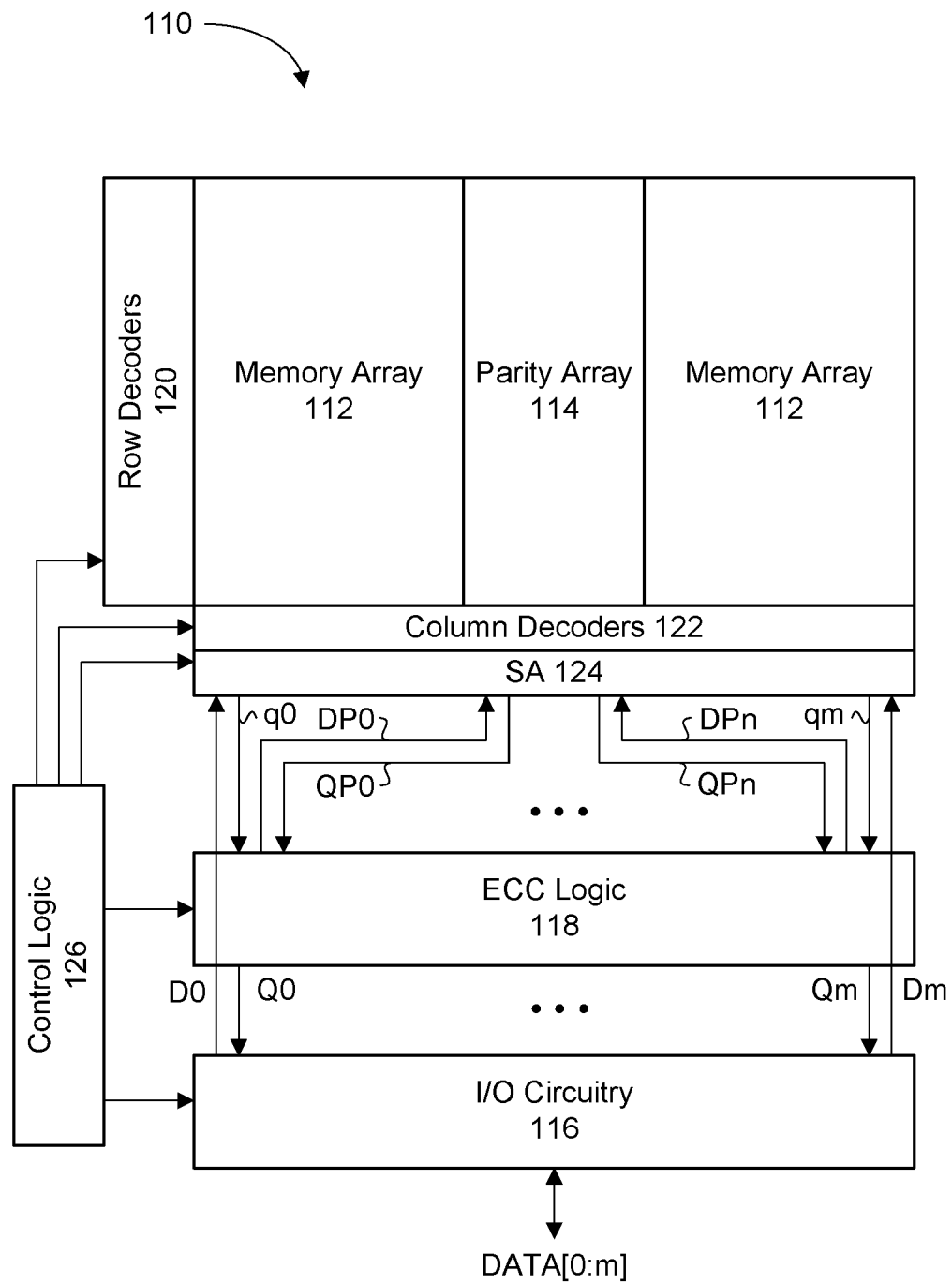
FIG. 3 is a block diagram of a memory with an ECC system according to an embodiment of the present invention.

Reference is made to FIG. 3 which shows a block diagram of a memory with an ECC system according to an embodiment of the present invention. To simplify the description, the numerals used previously in describing FIG. 1, will be used again after raising the numerals by 100 where circuit elements to be described share similarities with circuit elements already described. The memory with the ECC system of FIG. 3 is indicated generally by the numeral 110.

The memory with the ECC system 110 includes a main memory array 112 that includes memory cells arranged in rows and columns for storage of data, and a parity memory array 114 including memory cells arranged in rows and columns for storage of parity data. The memory with the ECC system 110 includes row and column decoders 120, respectively, for selecting the memory location and sense amplifiers 124 for amplification of the data. ECC logic circuitry 118 generates corresponding parity data bits based on the data bits received in a write cycle and evaluates whether data is correct and corrects data that is determined to be incorrect (again within the limits for detection and correction) during a read cycle. I/O circuitry 116 is connected to the ECC logic circuitry 118 for receiving input data and providing the input data to the ECC logic circuitry 118 and outputting data from the ECC logic circuitry 118. Control logic 126 controls the row and column decoders 120, 122, respectively, the sense amplifiers 124, the ECC logic circuitry 118 and the I/O circuitry 116 for read and write cycles.

Figure 1:
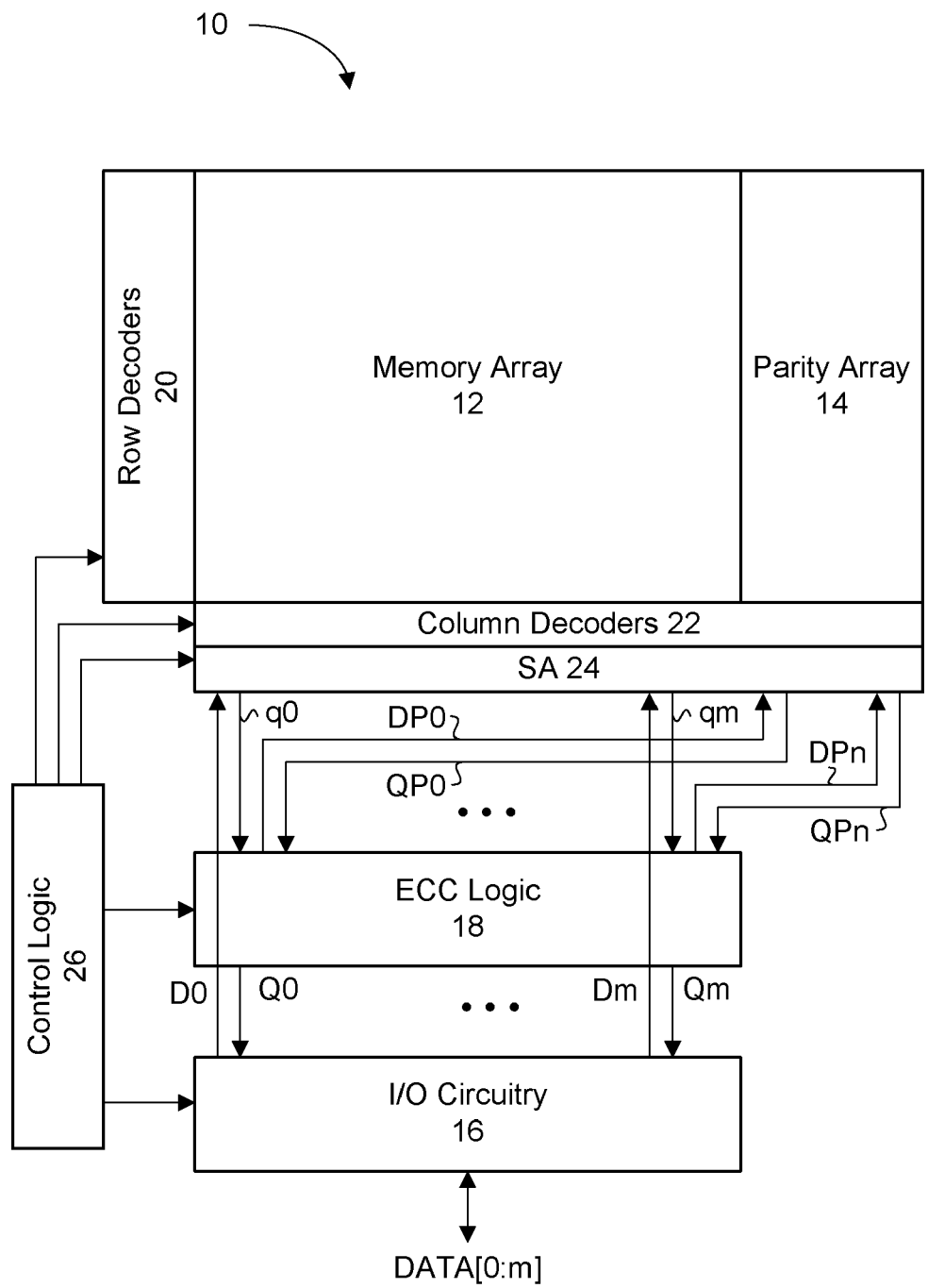
FIG. 1 is a block diagram of a typical memory with ECC logic circuitry.
Figure 2:
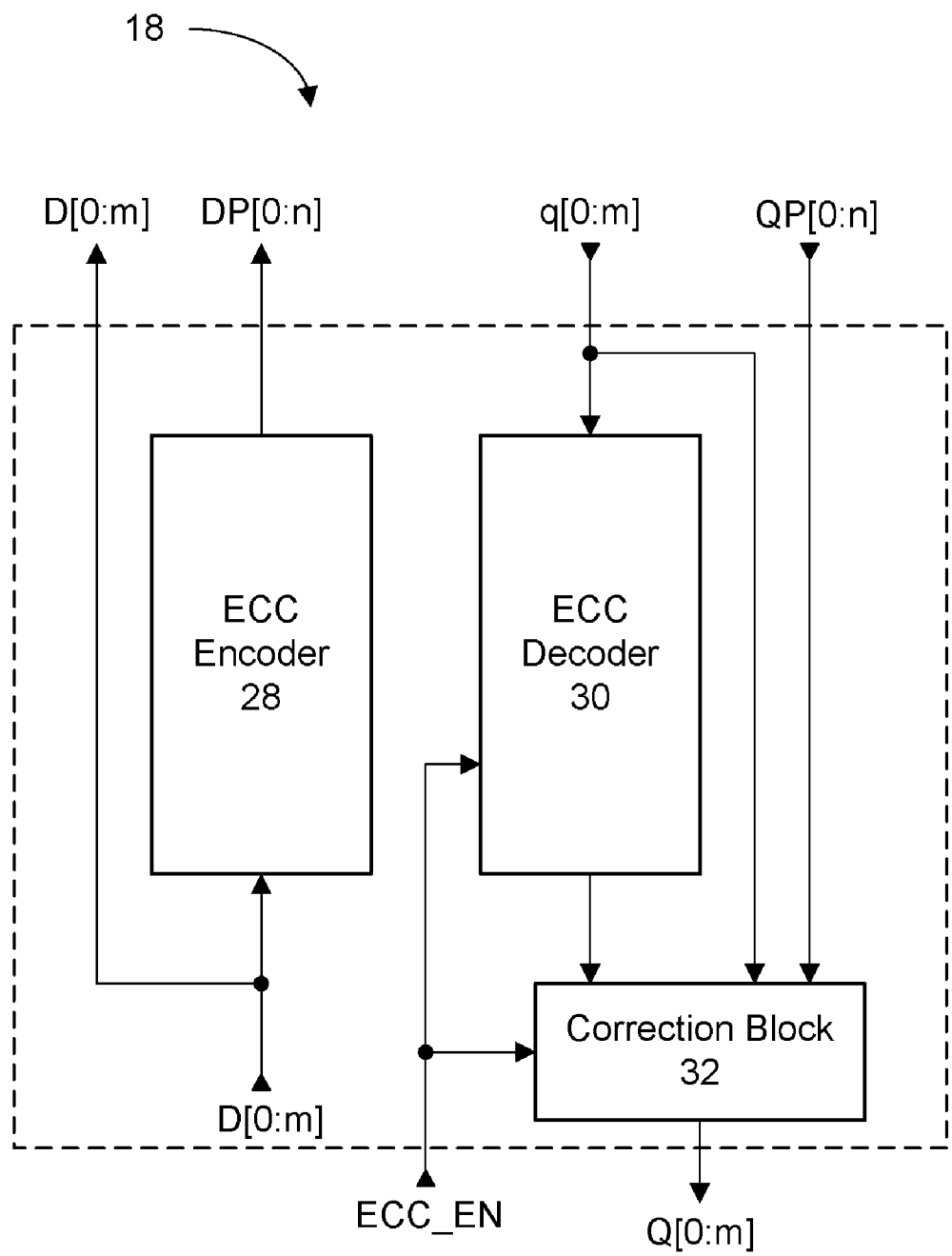
FIG. 2 is a block diagram of a conceptualization of ECC logic circuitry.

The functionality of the circuit blocks remains identical to the traditional memory with ECC shown in FIG. 1. However, performance of the memory with the ECC system 110 is improved by reducing the length of wiring for routing parity bits between the parity array and the ECC logic circuitry 118. As shown, the columns of the parity memory array 114 are physically located between the columns of the main memory array 112. According to the present embodiment, the parity columns of the parity memory array 114 are grouped together and located in the center of the main memory array 112. Thus, the main memory array 112 is logically divided into two sections, which can be referred to as sub-arrays.

In the presently shown example, M bits of data use N bits of parity data. For example, 32 bits of data use 6 bits of parity data. The M bits of data are stored in the main memory array 112 and the N bits of parity data are stored in the parity memory array 114 that is physically located between the columns of the main memory array 112.

The ECC logic circuitry 118 is physically arranged in the column direction of the memory array 112, such that specific data bits and parity bits are acted upon by logic elements in a particular area of the ECC logic circuitry 118. By placing the parity array 114 between the two memory arrays 112, the longest wire length for routing a parity bit is reduced as compared to the traditional memory with ECC shown in FIG. 1. A shorter routing wire has less resistance (R) and capacitance (C), thus reducing the RC delay. Furthermore, the reduction in wire length reduces the potential for cross-talk between adjacent routing wires. By example, if the longest parity routing wire is reduced by 50% relative to the traditional memory with ECC is shown FIG. 1, reducing the R by half and the C by half therefore reduces the RC delay to one quarter.

While the embodiment of FIG. 3 reduces the wiring length for routing parity bits by centrally positioning the parity array within the memory array, a further reduction of the parity bit wiring length can be realized by distributing individual parity columns throughout the memory array.

Figure 4:
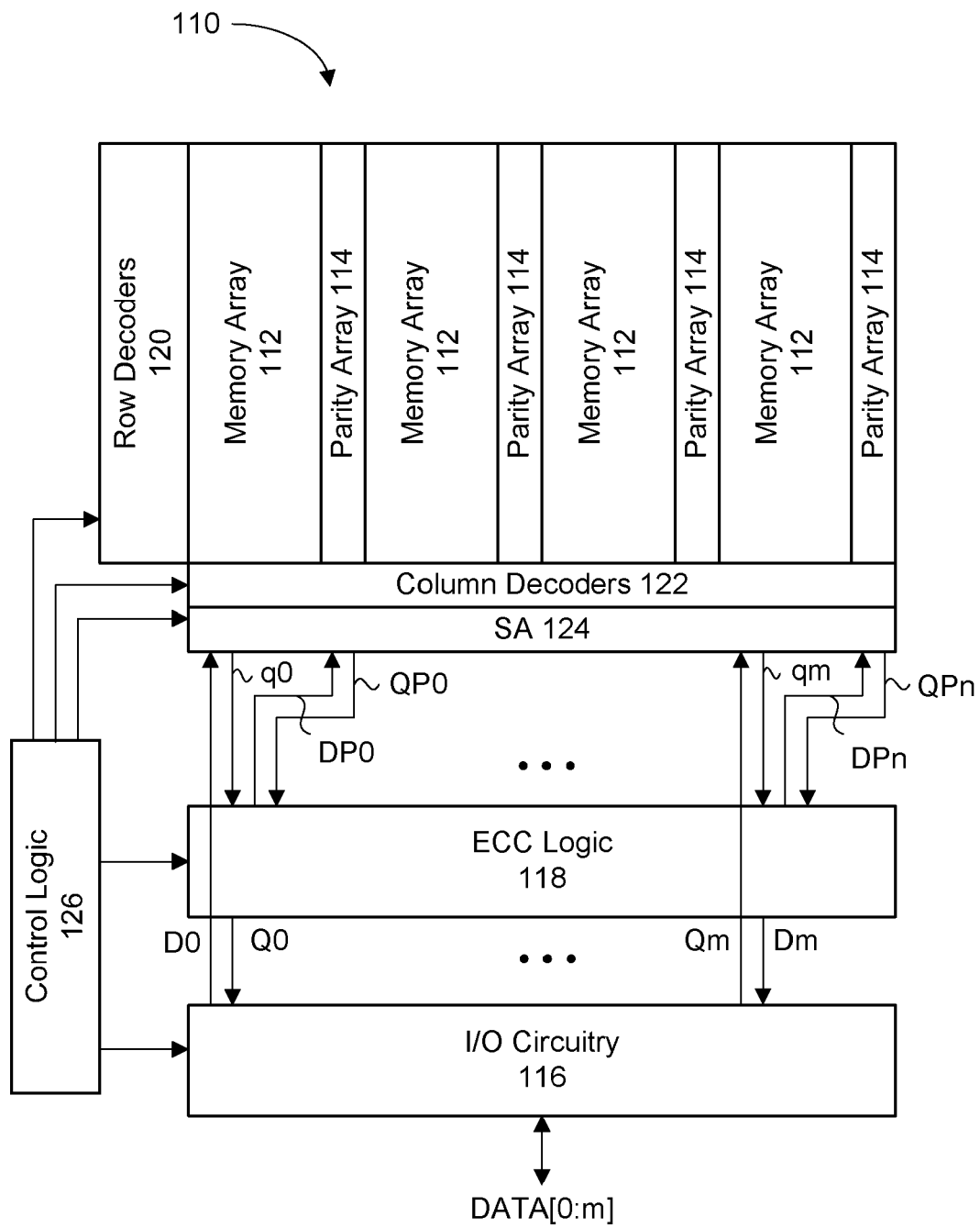
FIG. 4 is a block diagram of an exemplary memory with an ECC system according to another embodiment of the present invention.

Reference is now made to FIG. 4 to describe an exemplary memory with an ECC system according to another embodiment of the present invention. To simplify the description, the numerals used previously in describing FIG. 3 will be used again where circuit elements to be described share similarities with circuit elements already described. Accordingly, reference can be made to the embodiment of FIG. 3 for a description of the same numbered circuit elements. The memory with the ECC system of FIG. 4 is indicated generally by the numeral 110.

The memory with the ECC system 110 includes a main memory array 112 that includes memory cells arranged in rows and columns for storage of data, and a parity memory array 114 including memory cells arranged in rows and columns for storage of parity data. As shown, the columns of the parity memory array 114 are physically located between the columns of the main memory array 112. According to the present embodiment, the parity columns of the parity memory array 114 are logically divided into multiple sub-arrays and are dispersed in the logically divided main memory array 112. In the example shown in FIG. 4, the main memory array 112 is logically divided into four sub-arrays and the parity memory array 114 is logically divided into four sub-arrays. Assuming that the memory array capacity and the parity array capacity of the memory device of FIGS. 3 and 4 are the same, the aggregate memory capacity of the sub-arrays of memory array 112 of FIG. 4 is equivalent to the two segments of memory array 112 of FIG. 3. Similarly, the aggregate memory capacity of the sub-arrays of parity array 114 is equivalent to the parity array 114 of FIG. 3.

It will now be appreciated that individual parity memory columns can be individually placed at different physical locations within the main memory array 112 based on a minimized routing optimization of the parity bit from to and from the ECC logic circuitry 118. Thus, each of the parity columns are physically located between different columns of the main memory array 112, thereby distributing the parity columns within the memory and minimizing the wiring length, resulting a reduction in R and C and therefore in the RC delay. Further, the reduction in wire length reduces the potential for wire cross-talk. The parity memory sub-arrays can have at least one parity memory column, and different sub-arrays can have a different number of parity memory columns.

The previously described embodiments can be applied to any type of memory having ECC functionality, such as DRAM, SRAM, other volatile memories, Flash, EEPROM and other non-volatile memories.

Figure 5:
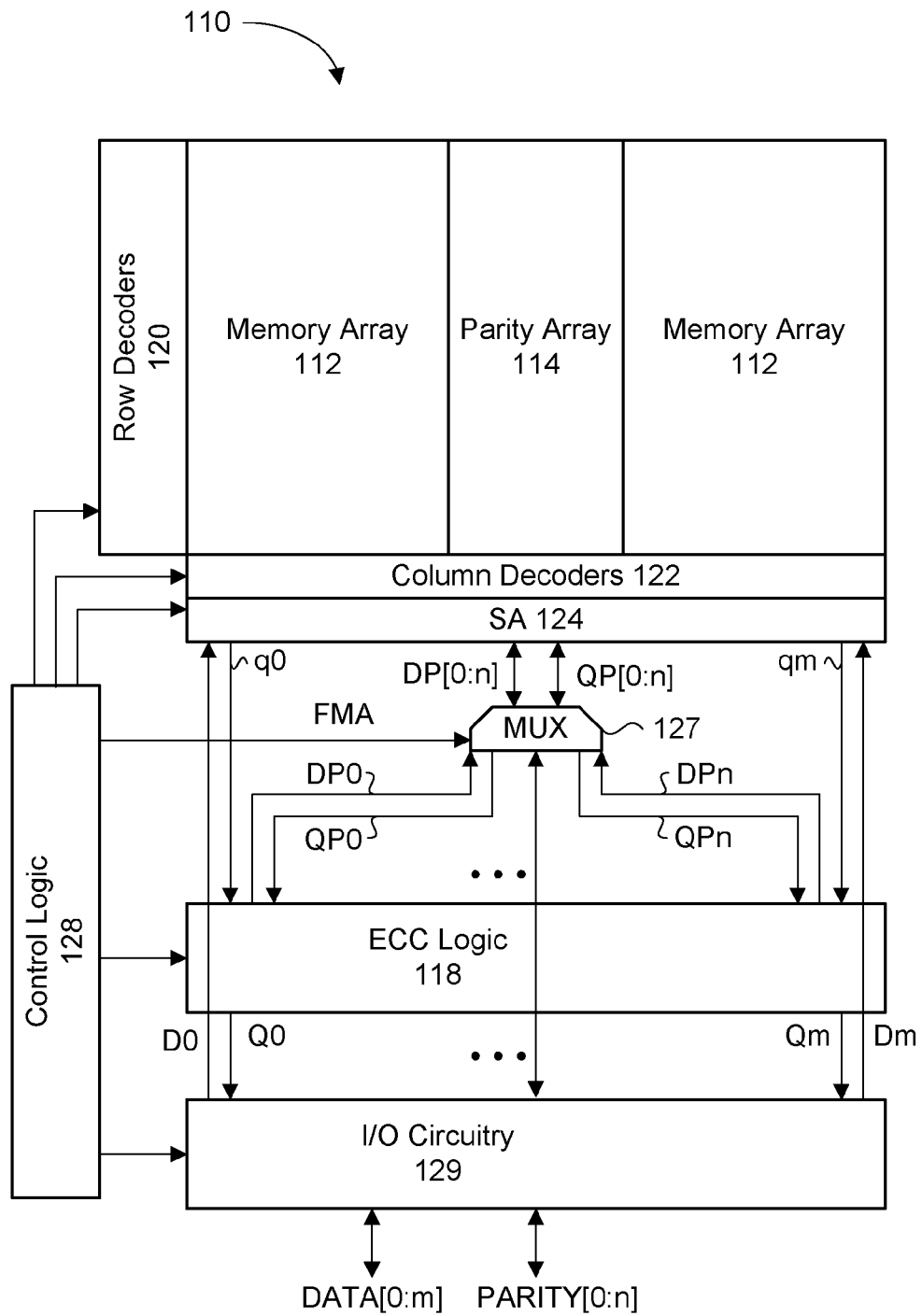
FIG. 5 is a block diagram of a memory with an ECC system according to another embodiment of the present invention.

Reference is now made to FIG. 5 to describe an exemplary memory with an ECC system having high testability, according to yet another embodiment of the present invention. To simplify the description, the numerals used previously in describing FIG. 3 will be used again where circuit elements to be described share similarities with circuit elements already described. The memory with the ECC system of FIG. 5 is indicated generally by the numeral 110.

The exemplary memory with an ECC system 110 according to the embodiment of FIG. 5 is similar to the memory embodiment of FIG. 3, but includes features for permitting testing of the parity array and the ECC logic functionality. Memory with ECC system 110 includes a main memory array 112 that includes memory cells arranged in rows and columns for storage of data, and a parity memory array 114 including memory cells arranged in rows and columns for storage of parity data. As shown, the columns of the parity memory array 114 are physically located between the columns of the main memory array 112. Row decoders 120 and column decoders 122 select a memory location for reading and writing data and sense amplifiers 124 sense and amplify data read from the memory array 112 and parity array 114. ECC logic circuitry 118 generates corresponding parity data bits based on the data bits received in a write cycle and evaluates whether data is correct and corrects data that is determined to be incorrect (again within the limits for detection and correction) during a read cycle.

To improve testability, a multiplexor circuit (MUX) 127 is located between the ECC logic circuitry 118 and the parity memory array 114. As previously discussed, the memory device may or may not have column decoders. Hence, MUX 127 will be connected to the column decoders 122, or it will be connected directly to the columns of the parity memory array 114. A control logic circuit 128 provides signal FMA for controlling MUX 127, in response to an external control signal, a mode latch or a Built-In Self Test (BIST) block. In a normal mode of operation, one value of FMA causes the parity data bits to be passed from the ECC logic circuitry 118 to the parity memory array 114, and from the parity memory array 114 to the ECC logic circuitry 118. In a test mode of operation, a second value of FMA couples parity memory array 114 to the I/O circuitry 129, which is configured to have dedicated I/O circuits for receiving or providing external data PARITY[0:N]. In otherwords, MUX 127 allows for a bypass of the ECC logic circuitry 118. Thus, the MUX 127 operates as a parity array access switch. The present embodiment including the MUX 127 as described, permits testing of the memory with the ECC system 110, including testing of the parity memory array 114 and the ECC logic circuitry 118. The main memory array 112 can be tested from a tester or from a BIST block. It will be appreciated that BIST blocks can be created to test semiconductor memories in known ways (i.e. march patterns).

In the presently shown embodiment of FIG. 5, MUX 127 is connected to I/O circuitry 129 with a single channel of bi-directional wires to reduce the number of dedicated I/O circuits. In such an embodiment, MUX 127 will include further multiplexing circuits for coupling the single channel to either DP[0:n] or QP[0:n]. Persons skilled in the art will understand how to implement MUX 127 to achieve this desired functionality. Of course, an alternate embodiment having two channels, one to be coupled to DP[0:n] and another to be coupled to QP[0:n], can be used. It is noted that while the embodiment of FIG. 5 is applied to the memory with ECC system embodiment of FIG. 3, it can be applied to any memory device having ECC functionality, including the traditional memory with ECC system shown in FIG. 1.

The inclusion of MUX 127 allows for several new testing methods to be executed. The parity memory array can be tested, and the ECC logic functionality can be tested, according to the testing methods to be described as follows.

Figure 6:
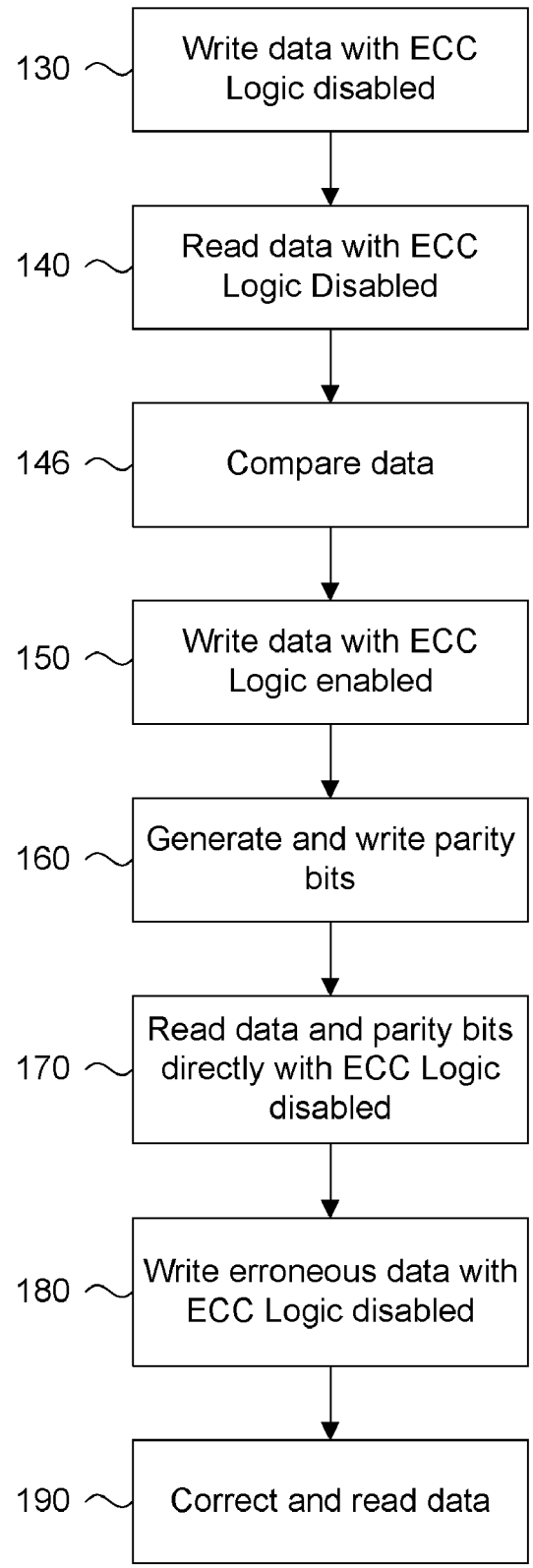
FIG. 6 is a flow chart showing steps in a method for testing of a parity memory array and ECC logic circuitry according to an embodiment of the present invention.

A method, according to an embodiment of the present invention, for full testing of the parity memory array 112 and ECC logic circuitry 118 of FIG. 5 will now be described with reference to the flow chart of FIG. 6.

Before any ECC logic function testing, the memory array 112 and the parity array 114 are tested for defective cells. First, test data is written to arrays 112 and 114 with the ECC logic circuitry disabled (step 130). The data written at step 130 is then read with the ECC logic circuitry 118 still disabled (step 140). More specifically, the data is read from the main memory array 112 and from the parity memory array 114. The data read from the main memory array 112 is compared to the data written to the main memory array 112 at step 130 and similarly, the data read from the parity memory array 114 is compared to the data written to the parity memory array 114 at step 130 to confirm that the main memory array 112 and parity memory array 114 have no defective memory cells. Should defective memory cells be present, then any type of redundancy technique can be used to replace the rows or columns having the defective cells with spare rows or columns.

With confirmation that the main memory array 112 and parity memory array 114 have no defective memory cells, the ECC logic circuitry is tested to confirm that parity bits are generated properly. A first ECC logic test is to confirm that parity bit generation is correct. Data is written with the ECC logic circuitry 118 enabled (step 150) and the parity access switch is set to ECC mode. In ECC mode, parity bits are generated by the ECC logic circuitry 118 in response to the data, and these parity bits generated by the ECC logic circuitry 118 are written to the parity memory array 114 (step 160). The data bits and the parity bits can be written to the main memory array 112 and the parity memory array 114, respectfully, at substantially the same time. The data is then read from the main memory array 112 and the parity bits are directly read from the parity memory array 114 with the ECC logic circuitry 118 disabled (step 170). It will now be appreciated that the parity bits that are read out can be compared with the expected parity bits based on the data written to the main memory array 114 for verification that the parity bits are correctly generated.

A second ECC logic test is to confirm that ECC correction functionality is correct. This is done by writing test data patterns with one or more known errors in either of both the main memory array 112 and the parity memory array 114, and checking if the erroneous data is corrected. For example, this can include writing a data pattern to be stored in the main memory array 112 with a known error while writing the corresponding parity data required for detecting and correcting the error to the parity memory array 114. Alternately, a correct data pattern can be written to the main memory array 112 while a data pattern with a known error is written to the parity memory array 114. Since the ECC logic circuit can correct data errors and parity data errors at the same time, erroneous data patterns can be written to both the main memory array 112 and the parity memory array 114. Therefore, erroneous data (erroneous data or parity data or both) is written to the main memory array 112 and to the parity memory array 114 with the ECC logic disabled (step 180). Next, the data and parity bits written to the main memory array 112 and the parity memory array 114, respectively, are read with the ECC logic circuitry 118 enabled (step 190). With the ECC logic circuitry enabled, the data should be corrected based on the written parity bits. The data is then read out to check if it has been properly corrected.

The direct parity array test, the first ECC logic test and the second ECC logic test can be executed in sequence, or can be executed independently of each other. The detailed steps for each of these tests will now be described in further detail.

Figure 7:
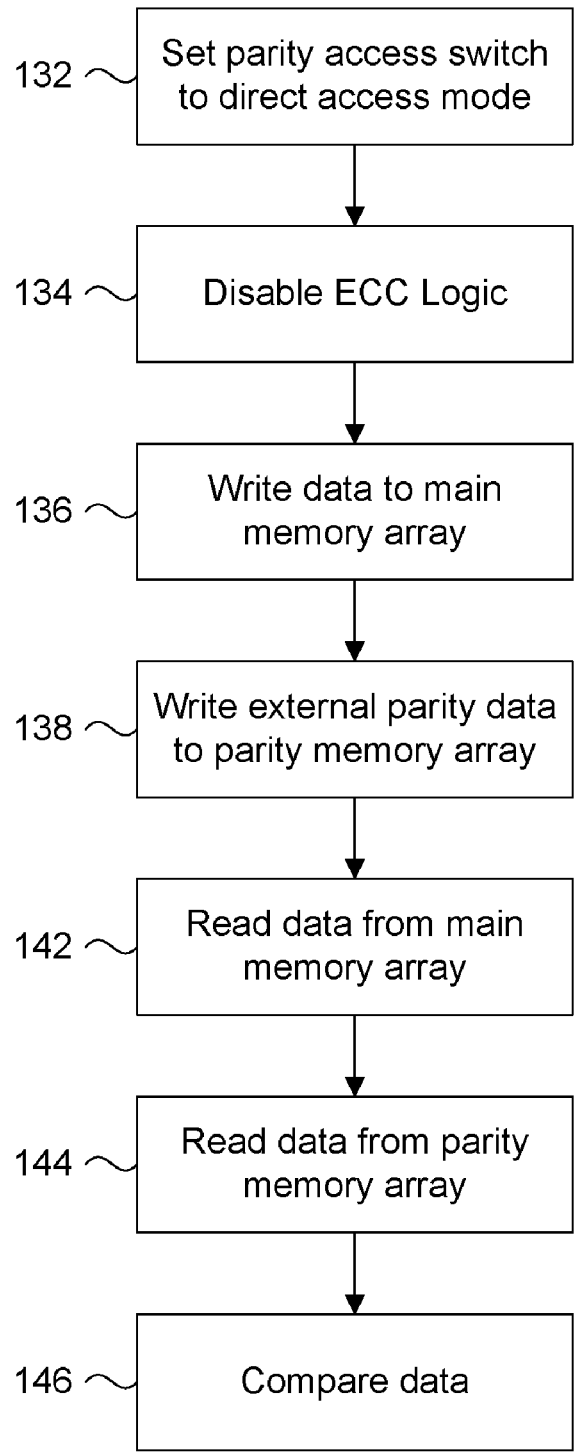
FIG. 7 is a flow chart showing steps in a method for testing a memory array according to an embodiment of the present invention.

Reference is now made to FIG. 7 to describe steps in a method for testing a parity array only, in accordance with an embodiment of the present invention. First, the parity access switch is set to direct access mode (step 132) and the ECC logic circuitry 118 is disabled (step 134). With the parity access switch (MUX 127 for example) set to direct access mode and the ECC logic circuitry 118 disabled, data is written to the main memory array 112 (step 136) and external parity data (data that is not generated in the ECC logic circuitry 118) is written to the parity memory array 114 (step 138). Steps 136 and 138 can be executed at the same time. The data written at step 136 is read from the main memory array 112 (step 142) and the data written at step 138 is read from the parity memory array 114 (step 144). The data read from the main memory array 112 is compared to the data written to the main memory array 112 and similarly, the data read from the parity memory array 114 is compared to the data written to the parity memory array 114 (step 146) to confirm that the main memory array 112 and parity array 114 have no bits that have changed state, as a change in logic state of any bit is indicative of a defective memory cell.

Figure 8:
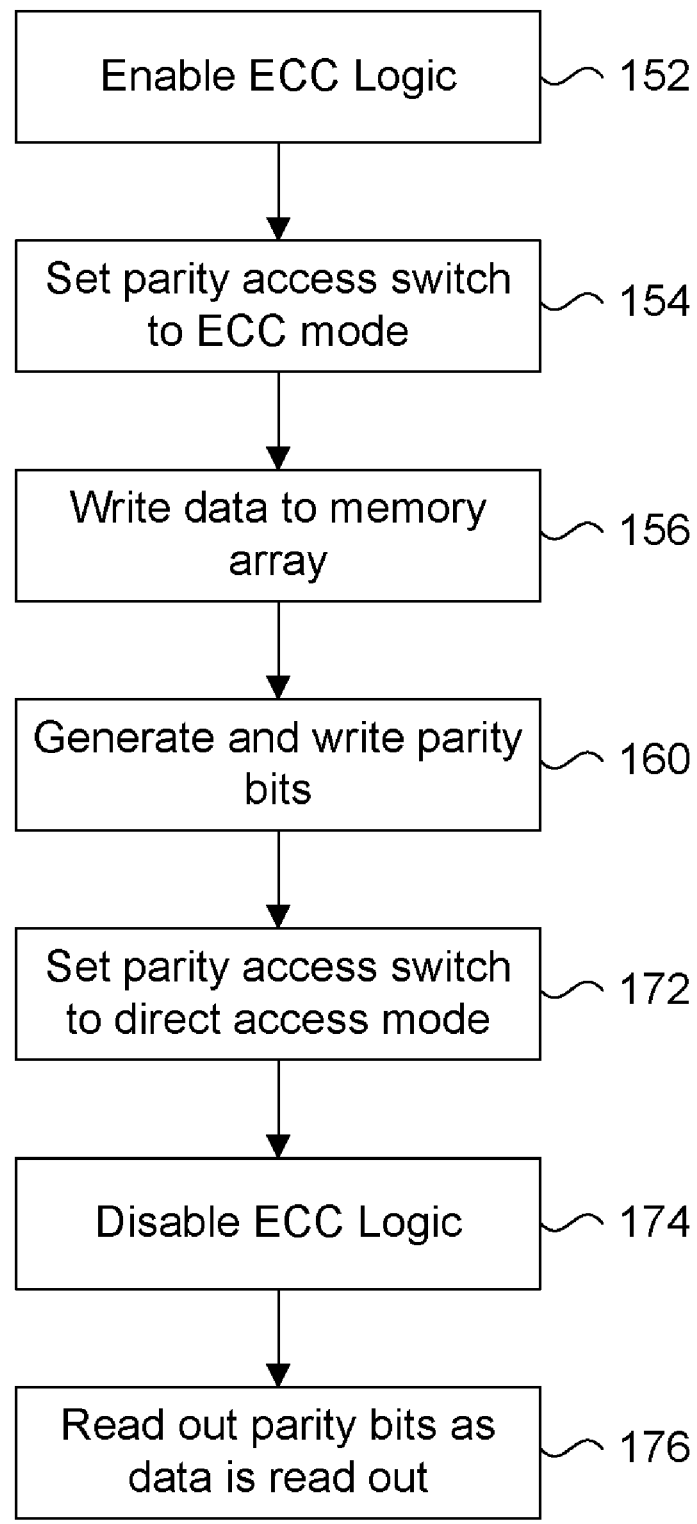
FIG. 8 is a flow chart showing steps in a method for testing ECC logic circuitry functionality according to an embodiment of the present invention.

Reference is now made to FIG. 8 to describe the steps in a method for testing parity bit generation only. The ECC logic circuitry 118 is enabled (step 152) and the parity access switch is set to ECC mode (step 154). With the parity access switch set to ECC mode, data is written to the main memory array 112 (step 156). The parity bits, corresponding to the bits of data for writing to the main memory array 112, are generated at the ECC logic circuitry 118 in response to the data and written to the parity memory array 114 (step 160). As indicated above the data bits and parity bits are written to the main memory array 112 and the parity memory array 114, respectfully, at substantially the same time. The parity access switch is then set to direct access mode (step 172) and the ECC logic circuitry 118 is disabled (step 174). With the parity access switch set to direct access mode and the ECC logic circuitry 118 disabled, the parity bits stored in the parity memory array 114 at step 160 are read out through the I/O circuitry 116 (step 176). The parity bits that are read out are compared with the expected parity bits based on the data written to the main memory array 114 for verification that the parity bits are correctly generated.

Figure 9:
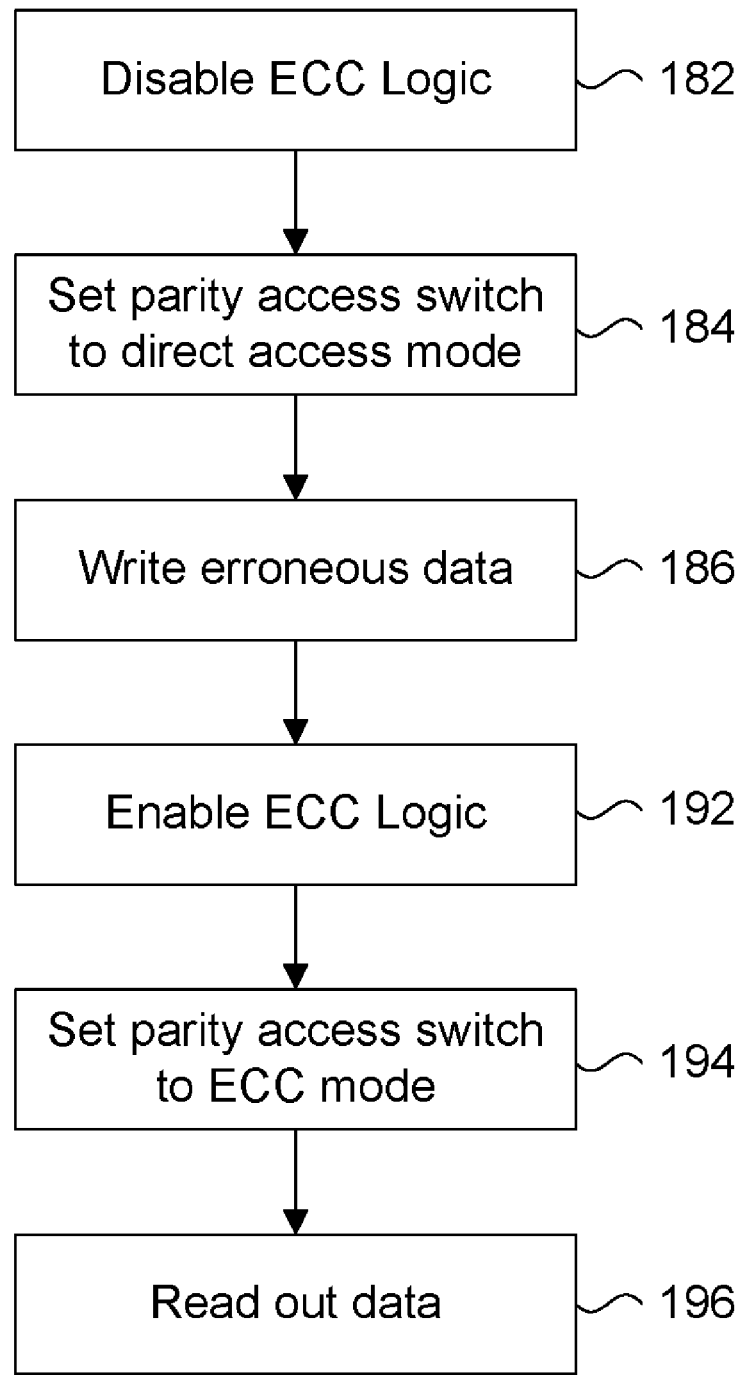
FIG. 9 is a flow chart showing steps in a method for testing ECC logic circuitry functionality according to another embodiment of the present invention.

Reference is now made to FIG. 9 to describe the steps in a method for testing ECC data correction functionality. The ECC logic circuitry 118 is disabled (step 182) and the parity access switch is set to direct access (step 184). Erroneous data with a known bit error is then written to the main memory array 112 (step 186) or to the parity memory array 114, or to both the main memory array 112 and the parity memory array 114. For example, in a detect 3/correct 2 ECC scheme, a single bit error can be introduced into the data of the main memory array 112 and a single bit error can be introduced into the data of the parity memory array 114. Next, the ECC logic circuitry is enabled (step 192) and the parity access switch is set to ECC mode (step 194), as described above. The data and the parity data is then read out (step 196) to check if the correction has taken place.

While FIGS. 7, 8 and 9 and the related description describes methods for testing a memory array, testing parity bit generation, and testing correction functionality, respectively, it will be appreciated that these methods can be performed alone or in combination. One such possible combination is shown and described in relation to FIG. 6. Other combinations are possible and it will be appreciated that testing can be carried out in any suitable order. For example, the correction functionality can be tested prior to the parity bit generation testing. Further, the correction functionality can be tested in the absence of parity bit generation testing. Similarly, the parity bit generation can be tested in the absence of correction functionality testing.

The above-described embodiments of the present invention are intended to be examples only. Alterations, modifications and variations may be effected to the particular embodiments by those of skill in the art without departing from the scope of the invention, which is defined by the claims appended hereto.

What is claimed is:

1. A method of testing error correction code (ECC) logic circuitry of a memory device having a parity array, the method comprising:
   writing test data directly to the memory device; and
   correcting the test data with the ECC logic circuitry,
      wherein the memory device comprises a memory array, the memory array comprises memory cells arranged in first columns for storage of data, and wherein the parity array comprises memory cells arranged in second columns for storage of parity data, the parity array physically having at least one second column located between two sub-arrays of the memory array.

2. The method of testing according to claim 1, wherein the step of writing test data comprises writing the test data directly to one of a memory array of the memory device, the parity array and both the memory array and the parity array.

3. The method of testing according to claim 2, wherein the step of writing the test data directly comprises:
   disabling said ECC logic circuitry;
   setting a switch for coupling said parity array to input/output circuitry for bypassing said ECC logic circuitry; and
   providing the test data to the input/output circuitry.

4. The method of testing according to claim 3, wherein the test data comprises erroneous parity data to be written to the parity array.

5. The method of testing according to claim 3, wherein the test data comprises erroneous data to be written to the memory device.

6. The method of testing according to claim 3, wherein the test data comprises at least one bit error to be written to the memory device and at least one bit error to be written to the parity array.

7. The method of testing according to claim 6, wherein the correcting the test data with the ECC logic circuitry comprises:
   enabling the ECC logic circuitry;
   setting a switch for coupling said parity array to said ECC logic circuitry;
   providing the test data to the ECC logic circuitry; and
   correcting the test data to provide corrected test data from the input/output circuitry.

8. The method of testing according to claim 1, wherein each of the second columns of the parity array are distributed in the memory array, the memory array being divided into at least two sub-arrays by the parity array.

9. The method of testing according to claim 1, wherein the second columns of the parity array are grouped together and located at about a center of the memory array, the memory array being divided into the two sub-arrays by the parity array.

10. A method of testing error correction code (ECC) logic circuitry of a memory device having a parity array, the method comprising:
    writing test data directly to the memory device; and
    correcting the test data with the ECC logic circuitry;
       wherein the step of writing test data comprises:
          disabling said ECC logic circuitry;
          coupling the parity array to input/output circuitry thereby bypassing the ECC logic circuitry; and
          providing the test data from the input/output circuitry.

11. The method of testing according to claim 10, wherein the correcting the test data with the ECC logic circuitry comprises:
    enabling the ECC logic circuitry;
    coupling the parity array to the ECC logic circuitry;
    providing the test data to the ECC logic circuitry; and
    correcting the test data to provide corrected test data to input/output circuitry.

12. The method of testing according to claim 10, wherein the test data comprises at least one bit error to be written to the memory device and at least one bit error to be written to the parity array.

13. The method of testing according to claim 10, wherein the memory device comprises a memory array, the memory array comprises memory cells arranged in first columns for storage of data, and wherein the parity array comprises memory cells arranged in second columns for storage of parity data, the parity array physically having at least one second column located between two sub-arrays of the memory array.

14. The method of testing according to claim 13, wherein each of the second columns of the parity array are distributed in the memory array, the memory array being divided into at least two sub-arrays by the parity array.

15. The method of testing according to claim 13, wherein the second columns of the parity array are grouped together and located at about a center of the memory array, the memory array being divided into the two sub-arrays by the parity array.

16. A method of testing error correction code (ECC) logic circuitry of a memory device having a parity array, the method comprising:
    writing test data directly to the memory device; and
    correcting the test data with the ECC logic circuitry;
       wherein the step of correcting the test data comprises:
          enabling the ECC logic circuitry;
          coupling the parity array to the ECC logic circuitry;
          providing the test data to the ECC logic circuitry; and
          correcting the test data to provide corrected test data to input/output circuitry.

17. The method of testing according to claim 16, wherein the memory device comprises a memory array, the memory array comprises memory cells arranged in first columns for storage of data, and wherein the parity array comprises memory cells arranged in second columns for storage of parity data, the parity array physically having at least one second column located between two sub-arrays of the memory array.

18. The method of testing according to claim 17, wherein each of the second columns of the parity array are distributed in the memory array, the memory array being divided into at least two sub-arrays by the parity array.

19. The method of testing according to claim 17, wherein the second columns of the parity array are grouped together and located at about a center of the memory array, the memory array being divided into the two sub-arrays by the parity array.

* * * * *